United States Patent
Kawamoto et al.

(10) Patent No.: US 6,904,207 B2
(45) Date of Patent: Jun. 7, 2005

(54) WAVEGUIDE TYPE LIQUID-CRYSTAL OPTICAL SWITCH

(75) Inventors: Shinji Kawamoto, Osaka (JP); Kenichi Nakama, Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 120 days.

(21) Appl. No.: 10/364,370

(22) Filed: Feb. 12, 2003

(65) Prior Publication Data

US 2003/0156793 A1 Aug. 21, 2003

(30) Foreign Application Priority Data

Feb. 14, 2002 (JP) .................................... P2002-036618

(51) Int. Cl.[7] .............................. G02B 6/10; G02B 6/35
(52) U.S. Cl. ............................. 385/41; 385/16; 385/21; 385/40; 385/50; 385/131
(58) Field of Search ........................... 385/8, 9, 16, 20, 385/21, 30, 40, 41, 130, 131

(56) References Cited

U.S. PATENT DOCUMENTS

| | | | | |
|---|---|---|---|---|
| 4,720,174 A | * | 1/1988 | Baker | ........................... 385/16 |
| 5,044,712 A | | 9/1991 | Soref | |
| 5,589,961 A | * | 12/1996 | Shigeta et al. | ................ 349/41 |
| 6,763,159 B2 | * | 7/2004 | Kawamoto | ................... 385/16 |

FOREIGN PATENT DOCUMENTS

| | | | |
|---|---|---|---|
| EP | 0 317 531 | 5/1989 | |
| EP | 05165068 | 6/1993 | |
| EP | 1 054 288 A2 | 11/2000 | |
| EP | 1054288 A2 * | 11/2000 | ......... G02F/1/1333 |
| JP | 5-165068 | 6/1993 | |
| JP | 05165068 A * | 6/1993 | ........... G02F/1/313 |

OTHER PUBLICATIONS

European Search Report dated Sep. 11, 2003.

* cited by examiner

*Primary Examiner*—Akm Enayet Ullah
*Assistant Examiner*—Omar Rojas
(74) *Attorney, Agent, or Firm*—Whitham, Curtis & Christofferson, PC

(57) ABSTRACT

A waveguide type liquid-crystal optical switch including: an optical waveguide having a pair of first and second cores close to each other for switching an optical path between the pair of first and second cores; a third core made of nematic liquid crystal enclosed in between a pair of oriented films and oriented in a predetermined direction by the pair of oriented films, the third core being disposed in any one of a space covering the first and second cores in parallel with a plane containing optical axes of the first and second cores, a space sandwiched between the first and second cores and a space covering upper surfaces of the first and second cores so as to be laid over the first and second cores; a first electrode disposed on a surface of the third core opposite to the first and second cores so as to cover a gap portion between the first and second cores; second and third electrodes disposed as a pair, between which electrodes the first electrode is put, the second and third electrodes provided for orienting liquid crystal molecules in a direction perpendicular to the direction of orientation of the oriented films; and a clad for collectively surrounding the first, second and third cores and the first, second and third electrodes.

20 Claims, 5 Drawing Sheets

WAVEGUIDE TYPE LIQUID-CRYSTAL OPTICAL SWITCH

BACKGROUND OF THE INVENTION

The present invention relates to an optical switch, for example, used in an optical communication system. More specifically, it relates to a waveguide type liquid-crystal optical switch for switching an optical path between cores by liquid crystal.

Optical communication has become popular in ordinary home use in recent years because a great volume of information can be transmitted/received at a high speed. The optical communication can be achieved by a transmission system using optical fibers. Various optical components such as a fiber type optical coupler, a waveguide type optical multiplexer/demultiplexer, a free-space propagation type optical multiplexer/demultiplexer, an optical switch, etc. have been developed to distribute an optical signal to respective terminals.

Of these optical components, the optical switch is important as an optical communication exchanger because it has a function of switching an optical path. Various types of optical switches are heretofore known as ones used in optical communication. Of these optical switches, an optical switch of the type using an optical waveguide for switching a propagating path of light by various kinds of physical phenomena has an advantage of high reliability and high speed because this type optical switch has no mechanically movable portion. As this type optical switch, there is known an optical switch using an optical waveguide such as a dielectric crystal waveguide of $LiNbO_3$ having an electro-optical or acousto-optical effect, a semiconductor waveguide using carrier injection, or a silica waveguide using a thermo-optical effect.

An optical switch using liquid crystal is also known as this type optical switch having such an optical waveguide. Liquid crystal has an electro-optical effect in the wide sense in which the refractive index of the liquid crystal varies in accordance with application of electric field. Liquid crystal further has the following properties: it can be actuated by a low voltage; it has high reliability as represented by satisfactory results in use for display; and it can be produced efficiently and inexpensively. For example, such a waveguide type liquid-crystal optical switch has been described in JP-A-5-165068. The waveguide type liquid-crystal optical switch has a structure in which: two single mode optical core patterns having coupling portions parallel and close to each other are formed on a lower clad; a lower electrode is further formed on a part of the lower clad corresponding to the coupling portions; and the coupling portions are filled with oriented liquid crystal and sealed with a glass plate having an upper electrode.

In the waveguide type liquid-crystal optical switch, however, the liquid crystal and the lower electrode are formed so that the nearly whole of the lower clad is covered with the liquid crystal and the lower electrode. Accordingly, because the refractive index of the clad varies in a wide region of the clad to disturb the waveguide mode, large crosstalk regarded as being fatal to the switch is generated. Moreover, if there are some liquid crystal molecules not oriented in a predetermined direction, scattering loss due to the non-oriented liquid crystal molecules increases because the coupling portions of the waveguide cores come into contact with the liquid crystal at three surfaces. Further, loss due to the lower electrode becomes very large because the lower electrode is located extremely close to the coupling portions of the wavelength cores. In addition, there is a problem that polarization dependence is high because the optical switch has a structure in which no electrode but a pair of upper and lower electrodes can be disposed.

SUMMARY OF THE INVENTION

The invention is developed in consideration of such circumstances and an object of the invention is to provide a waveguide type liquid-crystal optical switch which has an advantage of low power consumption, low cost and high reliability and which is improved in crosstalk and insertion loss and free from polarization dependence.

To achieve the foregoing object, the invention provides first, second and third waveguide type liquid-crystal optical switches as follows.

(1) A first waveguide type liquid-crystal optical switch including: an optical waveguide including a pair of first and second cores close to each other for switching an optical path between the pair of first and second cores; a third core made of nematic liquid crystal enclosed in between a pair of oriented films and oriented in a predetermined direction by the pair of oriented films, the third core being disposed in any one of a space covering the first and second cores in parallel with a plane containing optical axes of the first and second cores, a space sandwiched between the first and second cores and a space covering upper surfaces of the first and second cores so as to be laid over the first and second cores; a first electrode disposed on a surface of the third core opposite to the first and second cores so as to cover a gap portion between the first and second cores; second and third electrodes disposed as a pair, between which electrodes the first electrode is put, the second and third electrodes being provided for orienting liquid crystal molecules in a direction perpendicular to the direction of orientation of the oriented films; and a clad for collectively surrounding the first, second and third cores and the first, second and third electrodes.

(2) A second waveguide type liquid-crystal optical switch including: an optical waveguide including a pair of first and second cores close to each other for switching an optical path between the pair of first and second cores; a third core made of nematic liquid crystal enclosed in between a pair of oriented films and oriented in a predetermined direction by the pair of oriented films, the third core being disposed in any one of a space covering the first and second cores in parallel with a plane containing optical axes of the first and second cores, a space sandwiched between the first and second cores and a space covering upper surfaces of the first and second cores so as to be laid over the first and second cores; a pair of electrodes disposed on a surface of the third core opposite to the first and second cores, the pair of electrodes being provided for orienting liquid crystal molecules in a direction perpendicular to the direction of orientation of the oriented films; and a clad for collectively surrounding the first, second and third cores and the pair of electrodes.

(3) A third waveguide type liquid-crystal optical switch including: an optical waveguide including a pair of first and second cores close to each other for switching an optical path between the pair of first and second cores; a third core made of nematic liquid crystal enclosed in between a pair of oriented films and oriented in a predetermined direction by the pair of oriented films, the third core being disposed in a space sandwiched between the first and second cores; two pairs of electrodes disposed on an outer upper surface of the third core close to the first core and an outer lower surface of the third core close to the second core, respectively, along opposite sides of the first and second cores; and a clad for collectively surrounding the first, second and third cores and the two pairs of electrodes.

The present disclosure relates to the subject matter contained in Japanese patent application No. P2002-036618 (filed on Feb. 14, 2002), which is expressly incorporated herein by reference in its entirety.

DESCRIPTION OF THE PREFERRED EMBODIMENT

The invention will be described below in detail with reference to the drawings.
(First Waveguide Type Liquid-Crystal Optical Switch)

Figure 1:
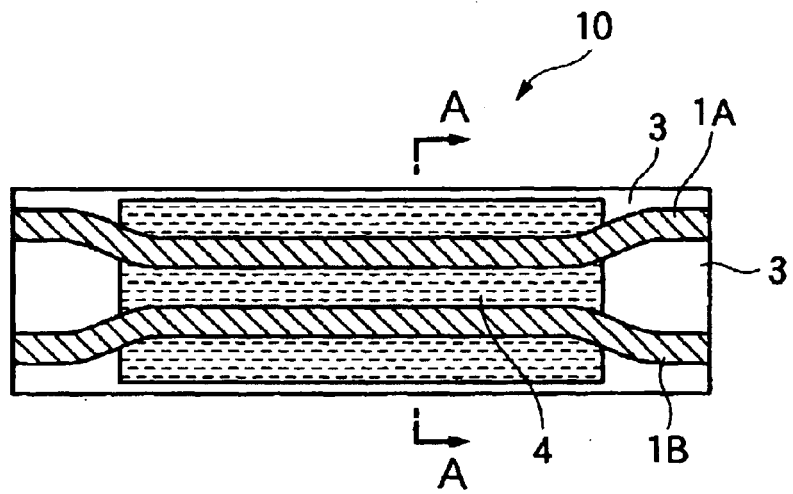
FIG. 1 is a plan view showing a first waveguide type liquid-crystal optical switch according to an embodiment of the invention.
Figure 2:
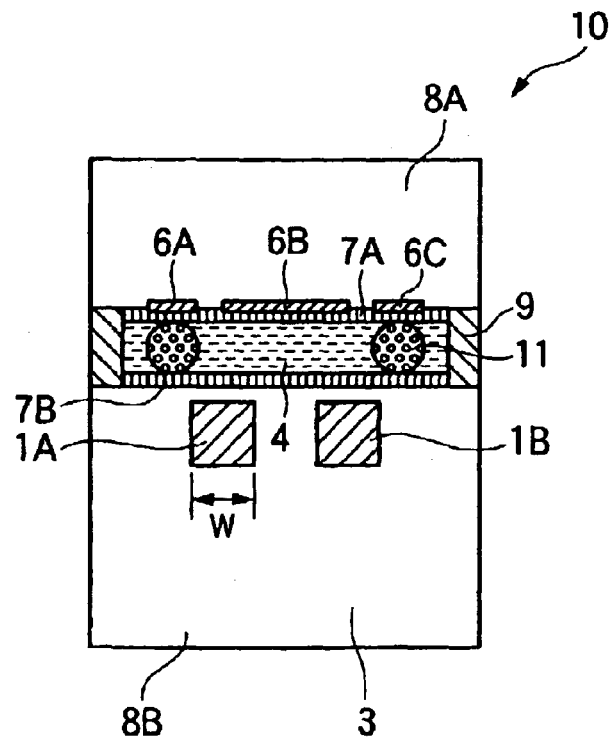
FIG. 2 is a sectional view taken along the line A—A in FIG. 1.

FIG. 1 is a plan view from the core side (from the bottom in FIG. 2), showing a first waveguide type liquid-crystal optical switch 10 according to an embodiment of the invention. FIG. 2 is a sectional view taken along the line A—A in FIG. 1. As shown in FIGS. 1 and 2, the waveguide type liquid-crystal optical switch 10 is divided into two, that is, an upper substrate 8A and a lower substrate 8B. In the lower substrate 8B, a first core 1A and a second core 1B are buried along the axis of the lower substrate 8B. Incidentally, in the following description, the first and second cores 1A and 1B are referred to as "cores 1A and 1B" respectively for short. The cores 1A and 1B are close and parallel to each other with a predetermined length in the central portion and the distance between the cores 1A and 1B is increasing toward opposite edges. The close parallel portions form a so-called directional coupler.

The upper and lower substrates 8A and 8B are made of a material having a refractive index lower than that of the material forming the cores 1A and 1B. For example, ($SiO_2$—$TiO_2$) having a refractive index of 1.523 can be used as the material of the upper and lower substrates 8A and 8B. The lower substrate 8B surrounds the cores 1A and 1B and serves as a clad 3. On the other hand, for example, ($SiCl_4$—$TiCl_4$) having a refractive index of 1.530 can be used as the material of the cores 1A and 1B.

A third core 4 is provided so that the lower substrate 8B is entirely covered with the third core 4. The third core 4 contains nematic liquid crystal sealed in sealing members 9 and upper and lower oriented films 7A and 7B. The sealing members 9 are provided along opposite edges of the lower substrate 8B. The thickness of liquid crystal of the third core 4 is adjusted by spacers 11.

The kind of nematic liquid crystal constituting the third core 4 is not limited. For example, 4-(4-pentylcyclohexyl) cyanobenzene can be used as the nematic liquid crystal. A known material may be used as the material of each of the upper and lower oriented films 7A and 7B. For example, a polyamide film subjected to a rubbing treatment can be used as each of the upper and lower oriented films 7A and 7B.

A first electrode 6B is formed on a surface of the upper oriented film 7A so that the gap between the pair of cores 1A and 1B is covered with the first electrode 6B. Second and third electrodes 6A and 6C are formed on opposite sides of the first electrode 6B and in slightly outward positions compared with the cores 1A and 1B respectively. The first, second and third electrodes 6B, 6A and 6C can be controlled respectively individually. The direction of orientation of liquid crystal molecules due to the second and third electrodes 6A and 6C is decided so as to cross perpendicularly the direction of orientation of the oriented films 7A and 7B.

Preferably, each of the cores 1A and 1B is formed so as to be far, by a distance of not shorter than a half of the width W of each of the cores 1A and 1B, from the respective electrodes. Although a transparent electrode material such as ITO can be used as the material of each of the electrodes, absorption becomes considerably large if infrared rays are used as a medium of transmission. Therefore, loss due to the absorption can be suppressed when the electrode-core distance is defined as described above.

Figure 3A:
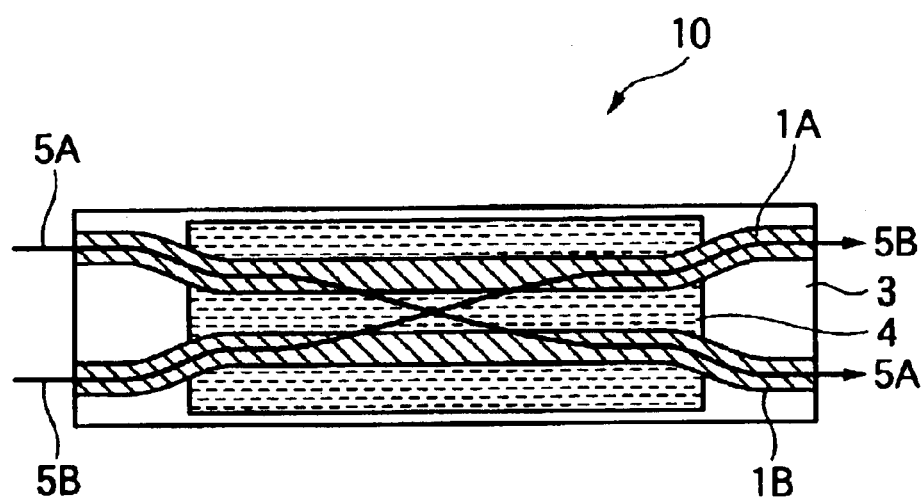
FIGS. 3A and 3B are plan views showing an example of the optical path switching state of the waveguide type liquid-crystal optical switch depicted in FIG. 1.
Figure 3B:
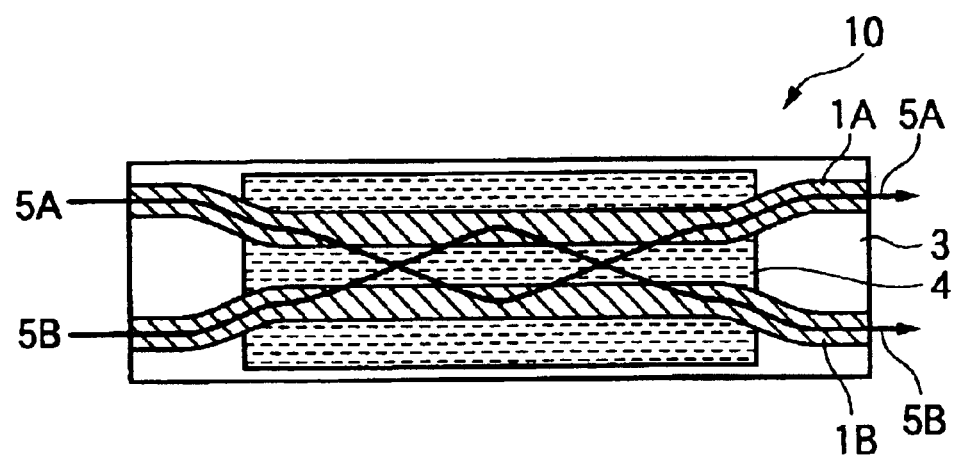

In the waveguide type liquid-crystal optical switch 10 configured as described above, the orientation of liquid crystal molecules in the third core 4 can be controlled by adjustment of a voltage applied between the pair of electrodes 6A and 6B to thereby switch the optical path between the cores 1A and 1B. For example, each of optical signals 5A and 5B can be transmitted from an incident side core to the third core 4 and further transferred to the other core as shown in FIG. 3A. For example, the optical signal transferred thus to the other core can be transmitted to the third core 4 again and further transferred to the incident side core as shown in FIG. 3B. Incidentally, in the following description, the case where each optical signal is output from the same core as the core on which the optical signal is incident is hereinafter called "ON state" (FIG. 3B), and the case where each optical signal is output from the other core than the core on which the optical signal is incident is hereinafter called "OFF state" (FIG. 3A).

Figure 4A:
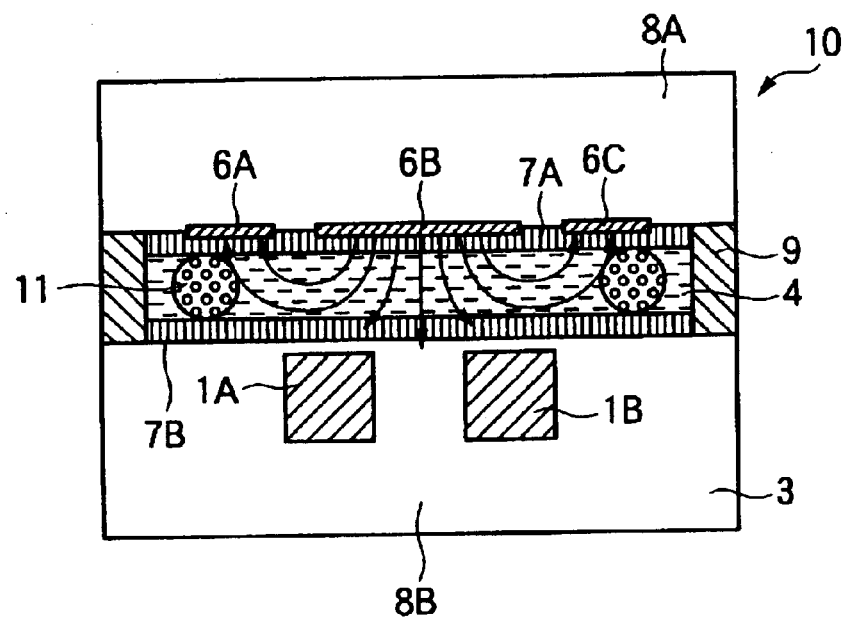
FIGS. 4A and 4B are sectional views for explaining the theory of optical path switching of the waveguide type liquid-crystal optical switch depicted in FIG. 1.
Figure 4B:
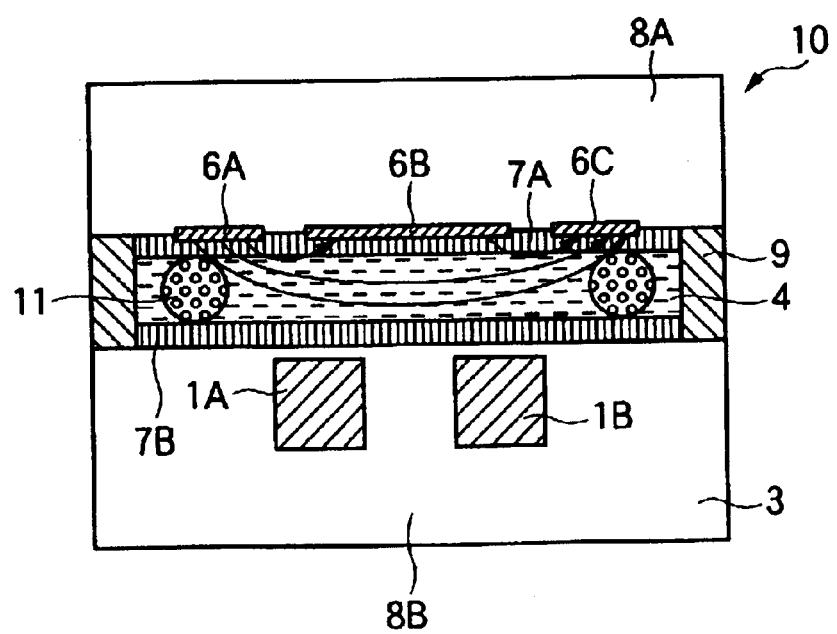

When an equiphase electric potential is applied to the second and third electrodes 6A and 6C with respect to the first electrode 6B as shown in FIG. 4A to switch the optical path, an electric field going from the first electrode 6B to the second and third electrodes 6A and 6C is generated in the third core 4 as represented by the arrows in FIG. 4A to thereby make an electric field going from the first electrode 6B to the cores 1A and 1B dominant. As a result, variation in coefficient of coupling to polarized light in TE mode (hereafter, polarized light in TE mode being referred to simply as TE polarized light) becomes dominant. On the other hand, when a reversed-phase potential with the potential of the first electrode 6B as a reference potential is applied to the second and third electrodes 6A and 6C as shown in FIG. 4B, an electric field going from the second electrode 6A to the third electrode 6C becomes dominant in the third core 4 as represented by the arrows in FIG. 4B to thereby make variation in coefficient of coupling to polarized light in TM mode (hereafter, polarized light in TM mode being referred to simply as TM polarized light) dominant. When the voltage and phase of the second and third electrodes 6A and 6C with respect to the first electrode 6B are adjusted in the aforementioned manner, the ON/OFF state both for TE polarized light and for TM polarized light can be adjusted to eliminate polarization dependence.

Generally, variation in refractive index of liquid crystal is larger by the order of tens of times than the refractive index difference between the material forming the cores 1A and 1B and the material forming the clad 3. Hence, the switching can be surely performed by a low voltage.

Incidentally, the switching mode in the case where nematic liquid crystal used in the third core 4 exhibits positive variation in refractive index is reversed to the switching mode in the case where the nematic liquid crystal exhibits negative variation in refractive index.

Figure 5:
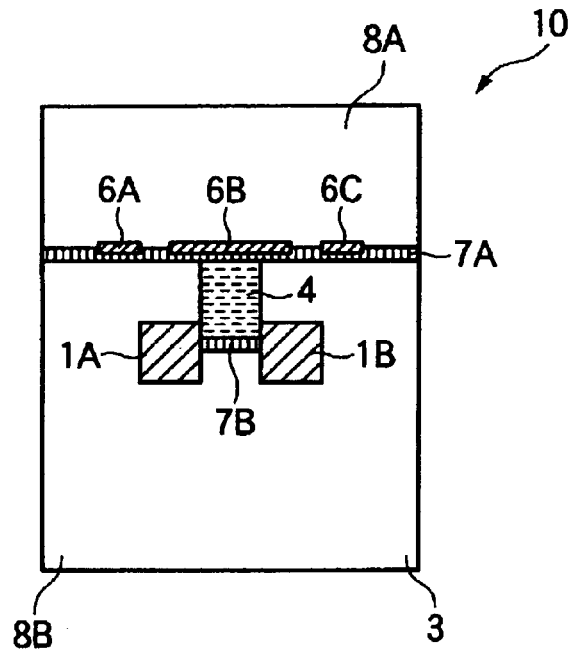
FIG. 5 is a sectional view showing a first waveguide type liquid-crystal optical switch according to another embodiment of the invention.

Further, the structure itself can be changed. For example, the third core 4 may be formed in a gap between parallel portions of the cores 1A and 1B as shown in FIG. 5 which is a sectional view similar to FIG. 2. That is, a lower oriented film 7B is formed in a lower portion of a groove which is formed along the gap between the cores 1A and 1B so as to extend from an upper surface of a lower substrate 8B. The groove is filled with nematic liquid crystal. The whole surface of the lower substrate 8B is covered with an upper oriented film 7A to thereby form the third core 4. Further, first, second and third electrodes 6B, 6A and 6C are provided on an upper surface of the upper oriented film 7A in the same manner as described above. In the waveguide type liquid-crystal optical switch 10 configured thus, only two, left and right side surfaces of the third core 4 in FIG. 5 come into contact with the cores 1A and 1B respectively. Hence, crosstalk is reduced greatly and loss is reduced compared with the related-art waveguide type liquid-crystal optical switch in which the third core 4 is formed so that the cores 1A and 1B are substantially entirely covered with the third core 4.

Incidentally, in the waveguide type liquid-crystal optical switch 10 configured as described above, the lower oriented film 7B may be omitted so that only the upper oriented film 7A is provided because it is difficult to form the lower oriented film 7B. Or the lower oriented film 7B of the third core 4 (or the lower portion of the groove) may be formed so as to extent to a position deeper than the cores 1A and 1B.

Figure 6:
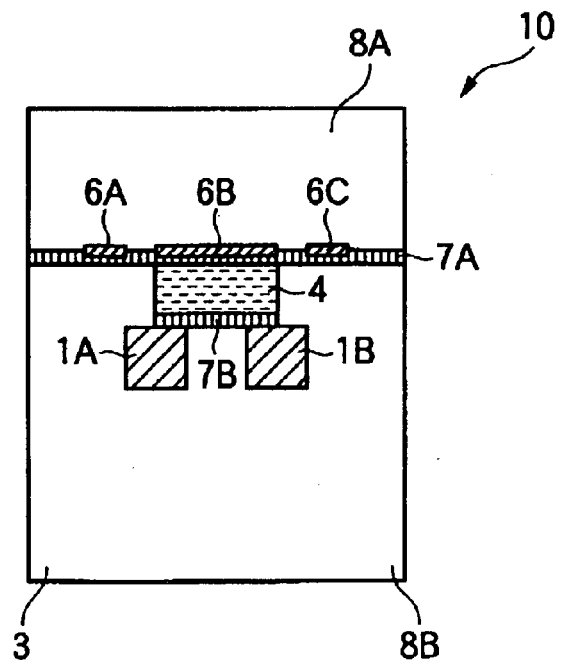
FIG. 6 is a sectional view showing a first waveguide type liquid-crystal optical switch according to a further embodiment of the invention.

Further, the third core 4 may be formed so that only the upper surfaces of the cores 1A and 1B are covered with the third core 4 as shown in FIG. 6 which is a sectional view similar to FIG. 5. Although the lower oriented film 7B of the third core 4 may be brought into contact with the upper surfaces of the cores 1A and 1B, a very slight gap may be provided between each of the upper surfaces of the cores 1A and 1B and the lower oriented film 7B if there is fear of optical influence of the lower oriented film 7B.

(Second Waveguide Type Liquid-Crystal Optical Switch)

Though not shown, a second waveguide type liquid-crystal optical switch according to another embodiment of the invention has a structure in which any one of the three electrodes 6A, 6B and 6C is removed from each example of the first waveguide type liquid-crystal optical switch 10. Incidentally, in this case, switching of the optical path by the third core 4 is limited to either polarized light. When, for example, the first electrode 6B is removed, an optical path for TE polarized light can be switched because a horizontal electric field between the second and third electrodes 6A and 6C becomes dominant (see FIG. 4B). When, for example, the second or third electrode 6A or 6C is removed, an optical path for TM polarized light can be switched because an electric field going toward the core side becomes dominant (see FIG. 4A).

Accordingly, in the second waveguide type liquid-crystal optical switch 10, when optical signals 5A and 5B are polarized at random, a polarizing unit such as a wave plate for polarizing the optical signals 5A and 5B into either TE polarized light or TM polarized light is separately provided on the input side of the waveguide type liquid-crystal optical switch 10.

(Third Waveguide Type Liquid-Crystal Optical Switch)

Figure 7:
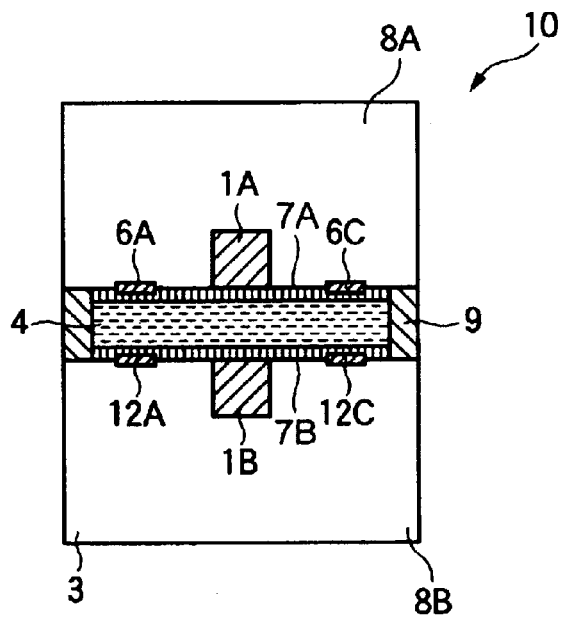
FIG. 7 is a sectional view showing a third waveguide type liquid-crystal optical switch according to an embodiment of the invention.

A third waveguide type liquid-crystal optical switch 10 according to a further embodiment of the invention is shown in FIG. 7 which is a sectional view similar to FIG. 6. In third the waveguide type liquid-crystal optical switch 10, the third core 4 is disposed between the upper substrate 8A and the lower substrate 8B. A core 1A and a pair of upper electrodes 6A and 6C are provided on a surface of the upper oriented film 7A so that the core 1A is disposed between the pair of upper electrodes 6A and 6C. The other core 1B and a pair of lower electrodes 12A and 12C are provided on a surface of the lower oriented film 7B so that the core 1B and the pair of lower electrodes 12A and 12C are located opposite to the core 1A and the pair of upper electrodes 6A and 6C respectively. That is, the pair of cores 1A and 1B, the pair of upper electrodes 6A and 6C and the pair of lower electrodes 12A and 12C are provided so that the third core 4 is clamped. The thickness of liquid crystal is adjusted by spacers not shown. The third core 4 is sealed with sealing members 9.

In the third waveguide type liquid-crystal optical switch 10, when the upper electrodes 6A and 6C are kept equal in electric potential while an electric potential is applied to the lower electrodes 12A and 12C, variation in coefficient of coupling for TE polarized light becomes dominant. When a pair of opposite electrodes (e.g., 6A and 12A) are kept equal in electric potential while an electric potential is applied to the other pair of opposite electrodes (e.g., 6C and 12C), variation in coefficient of coupling for TM polarized light becomes dominant. Accordingly, polarization dependence can be eliminated in the same manner as in the first waveguide type liquid-crystal optical switch. Incidentally, pairs of electrodes between which a voltage is applied may be combined variously. For example, a pair of electrodes 6A and 12C and a pair of electrodes 6C and 12A may be combined.

(Double Gate Type Optical Switch System)

An even number of waveguide type liquid-crystal optical switches 10 as defined above can be connected to one another to form a single optical switch-like structure having a pair of input ends and a pair of output ends as a whole. In the invention, the configuration having such an even number of waveguide type liquid-crystal optical switches 10 connected to one another and functioning as a single optical switch as a whole is defined as "double gate type optical switch system".

Figure 8:
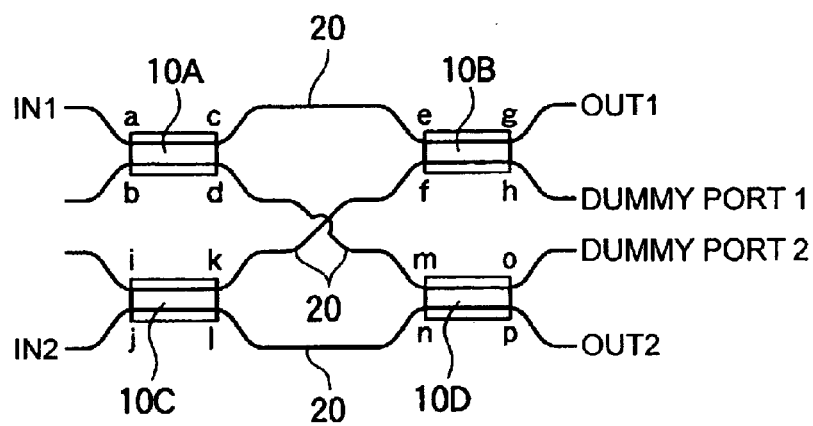
FIG. 8 is a plan view showing a double gate type optical switch system having four waveguide type liquid-crystal optical switches connected to one another according to the invention.

FIG. 8 is a typical view showing a double gate type optical switch system having four waveguide type liquid-crystal optical switches as an example of the double gate type optical switch system. The double gate type optical switch system shown in FIG. 8 is configured as follows. One output end c of a first waveguide type liquid-crystal optical switch 10A is connected to one input end e of a second waveguide type liquid-crystal optical switch 10B by an optical waveguide 20. The other output end d of the first waveguide type liquid-crystal optical switch 10A is connected to one input end m of a fourth waveguide type liquid-crystal optical switch 10D by an optical waveguide 20. One output end k of a third waveguide type liquid-crystal optical switch 10C is connected to the other input end f of the second waveguide type liquid-crystal optical switch 10B by an optical waveguide 20. The other output end l of the third waveguide type liquid-crystal optical switch 10C is connected to the other input end n of the fourth waveguide type liquid-crystal optical switch 10D by an optical waveguide 20. One input end a of the first waveguide type liquid-crystal optical switch 10A is used as a first input port (IN1). One input end j of the third waveguide type liquid-crystal optical switch 10C is used as a second input port (IN2). One output end g of the second waveguide type liquid-crystal optical switch 10B is used as a first output port (OUT1). One output end p of the fourth waveguide type liquid-crystal optical switch 10D is used as a second output port (OUT2). Accordingly, the other output end h of the second waveguide type liquid-crystal optical switch 10B is terminated as a dummy port 1, and the other output end o of the fourth waveguide type liquid-crystal optical switch 10D is terminated as a dummy port 2.

The ON/OFF state in the double gate type optical switch system is defined in the same manner as in the waveguide type liquid-crystal optical switch (see FIGS. 3A and 3B). That is, a state in which an optical signal given from the first input port IN1 is output from the first output port OUT1 while the other optical signal given from the second input port IN2 is output from the second output port OUT2 is defined as "ON state". Conversely, a state in which an optical signal given from the first input port IN1 is output from the second output port OUT2 while the other optical signal given from the second input port IN2 is output from the first output port OUT1 is defined as "OFF state". In addition, the ratio of the intensity of an optical signal to be output from each output port in the ON or OFF state to the intensity of an optical signal (stray light) not to be output is defined as "extinction ratio".

To obtain the ON state of the double gate type optical switch system, all the waveguide type liquid-crystal optical switches 10A to 10D are switched ON. As a result, an optical signal input into the first input port IN1 is output from the output end c of the first waveguide type liquid-crystal optical switch 10A, input into the input end e of the second waveguide type liquid-crystal optical switch 10B and output from the output end g, that is, the first output port OUT1. On this occasion, even if there is stray light, the stray light is not output from the original output ports because stray light in the first waveguide type liquid-crystal optical switch 10A is output from the output end d and reaches the dummy port 2 while stray light in the second waveguide type liquid-crystal optical switch 10B reaches the dummy port 1. Thus, a high extinction ratio can be achieved.

On the other hand, to obtain the OFF state, all the waveguide type liquid-crystal optical switches 10A to 10D may be switched OFF. Also on this occasion, stray light is output from either dummy port 1 or dummy port 2.

Figure 9:
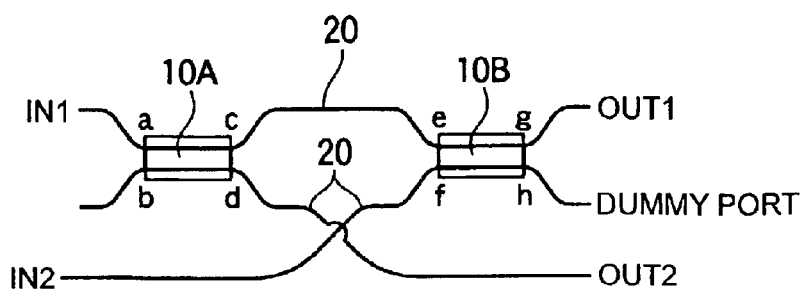
FIG. 9 is a plan view showing a double gate type optical switch system having two waveguide type liquid-crystal optical switches connected to each other according to the invention.

As shown in FIG. 9, two waveguide type liquid-crystal optical switches 10 maybe connected to each other to form a single optical switch as a whole. This configuration is as follows. One output end c of a first waveguide type liquid-crystal optical switch 10A is connected to one input end e of a second waveguide type liquid-crystal optical switch 10B by an optical waveguide 20. One input end a of the first waveguide type liquid-crystal optical switch 10A is used as a first input port IN1. The other input end f of the second waveguide type liquid-crystal optical switch 10B is used as a second input port IN2. One output end g of the second waveguide type liquid-crystal optical switch 10B is used as a first output port OUT1. The other output end d of the first waveguide type liquid-crystal optical switch 10A is used as a second output port OUT2. The other output end h of the second waveguide type liquid-crystal optical switch 10B is used as a dummy port.

To obtain the ON state of the double gate type optical switch system, the first and second waveguide type liquid-crystal optical switches 10A and 10B are switched ON. As a result, an optical signal input into the first input port IN1 is output from the output end c of the first waveguide type liquid-crystal optical switch 10A, input into the input end e of the second waveguide type liquid-crystal optical switch 10B and output from the output end g, that is, the first output port OUT1. On this occasion, even if there is stray light, the stray light reaches the other output end d of the first waveguide type liquid-crystal optical switch 10A and is output from the second output port OUT2. Thus, the extinction ratio becomes the same as in the case where a waveguide type liquid-crystal optical switch is used singly.

On the other hand, to obtain the OFF state, the first and second waveguide type liquid-crystal optical switches 10A and 10B are switched OFF. As a result, each stray light in optical signals input into the first and second input ports IN1 and IN2 is output from the dummy port.

As described above, the double gate type optical switch system having the two waveguide type liquid-crystal optical switches 10A and 10B is inexpensive because the number of waveguide type liquid-crystal optical switches is small. It is however necessary that the double gate type optical switch system is configured so that the second output port OUT2 is not used in the ON state because it is impossible to output light from the second input port IN2 to the second output port OUT2.

Although it is preferable that the double gate type optical switch system is configured so that all waveguide type liquid-crystal optical switches are integrally connected to one another on a substrate by optical waveguides, the invention may be also applied to the case where waveguide type liquid-crystal optical switches formed separately are connected to one another by optical fibers.

As described above, in accordance with the invention, there can be provided a waveguide type liquid-crystal optical switch which is low in insertion loss and high in performance compared with the related-art waveguide type liquid-crystal optical switch.

What is claimed is:

1. A waveguide type liquid-crystal optical switch comprising an optical waveguide including a pair of first and second cores close to each other for, switching an optical path between said pair of first and second cores, said switching further comprising:

a third core made of nematic liquid crystal enclosed in between a pair of oriented films and oriented in a predetermined direction by said pair of oriented films, said third core being disposed in any one of a space covering said first and second cores in a parallel with a plane containing optical axes of said first and second cores, a space sandwiched between said first and second cores and a space covering upper surfaces of said first and second cores so as to be laid over said first and second cores;

a first electrode disposed on a surface of said third core opposite to said first and second cores so as to cover a gap portion between said first and second cores;

second and third electrodes disposed as a pair, between which electrodes said first electrode is put, said second and third electrodes being provided for orienting liquid crystal molecules in a direction perpendicular to the direction of orientation of said oriented films; and a clad for collectively surrounding said first, second and third cores and said first, second and third electrodes.

2. A waveguide type liquid-crystal optical switch according to claim 1, wherein voltages applied to the respective electrodes and phases of said voltages are adjusted to change a refractive index of said third core with respect to polarized light in TE or TM mode to thereby switch said optical path between said first and second cores.

3. A waveguide type liquid-crystal optical switch according to claim 1, wherein each of said electrodes is far, by a distance not shorter than half of a width of the first or second core, from said first or second core.

4. A waveguide type liquid-crystal optical switch comprising an optical waveguide including a pair of first and second cores close to each other for, switching an optical path between said pair of first and second cores, said switching further comprising:

a third core made of nematic liquid crystal enclosed in between a pair of oriented films and oriented in a predetermined direction by said pair of oriented films, said third core being disposed in any one of a space covering said first and second cores in a parallel with a plane containing optical axes of said first and second cores, a space sandwiched between said first and second cores and a space covering upper surfaces of said first and second cores so as to be laid over said first and second cores;

a pair of electrodes disposed on a surface of said third core opposite to said first and second cores, said pair of electrodes being provided for orienting liquid crystal molecules in a direction perpendicular to the direction of orientation of said oriented films; and a clad for collectively surrounding said first, second and third cores and said pair of electrodes.

5. A waveguide type liquid-crystal optical switch according to claim 4, wherein each of said electrodes is far, by a distance not shorter than a half of a width of the first or second core, from said first or second core.

6. A waveguide type liquid-crystal optical switch according to claim 4, further comprising a polarizing unit for standardizing incident light into polarized light in TE or TM mode.

7. The waveguide type liquid-crystal optical switch according to claim 4, wherein the third core is disposed in a space covering the first and second cores in parallel with a plane containing optical axes of said first and second cores.

8. The waveguide type liquid-crystal optical switch according to claim 4, wherein the third core is disposed in a space sandwiched between the first and second cores and in a space covering upper surfaces of said first and second cores so as to be laid over said first and second cores.

9. A waveguide type liquid-crystal optical switch comprising an optical waveguide including a pair of first and second cores close to each other, for switching an optical path between said pair of first and second cores, said switch further comprising:

a third core made of nematic liquid crystal enclosed in between a pair of oriented films and oriented in a predetermined direction by said pair of oriented films, said third core being disposed in a space sandwiched between said first and second cores;

two pairs of electrodes disposed on an outer upper surface of said third core close to said first core and an outer lower surface of said third core close to said core, respectively, along opposite sides of said first and second cores; and a clad for collectively surrounding said first, second and third cores and said two pairs of electrodes.

10. A waveguide type liquid-crystal optical switch according to claim 9, wherein voltages applied to the respective electrodes are adjusted to change a refractive index of said third core with respect to polarized light in TE or TM mode to thereby switch said optical path between said first and second cores close to each other.

11. A double gate type optical switch system comprising:

two or four waveguide type liquid-crystal optical switches defined in claim 1; and optical waveguides or optical fibers by which said two or four waveguide type liquid-crystal optical switches are connected to each other or one another so that an output end of one waveguide type liquid-crystal optical switch is connected to an input end of the other or another waveguide type liquid-crystal optical switch by an optical waveduide or optical fiber;

wherein said double gate type optical switch system has two input ends, two output ends and one or two dummy output ends as a whole.

12. An optical switch comprising:

first and second cores;

a third core of nematic liquid crystal disposed proximate the first and second cores, the third core defining a first side and second side opposite from the first side with respect to the third core;

at least two electrodes disposed in the first side; and the first and second cores are, at least in part, disposed in the second side.

13. The optical switch according to claim 12, wherein the at least two electrodes are disposed on a plane substantially parallel to a plane containing optical axes of the first and second cores.

14. An optical switch comprising:

first and second cores;

a third core of nematic liquid crystal disposed proximate the first and second cores, the third core defining a first side and second side opposite from the first side with respect to the third core;

at least two electrodes disposed in the first side wherein said at least two electrodes are arranged along a direction that is perpendicular to an optical axis of said first and second cores.

15. The optical switch according to claim 14, wherein the first electrode is confronted, via the third core, with a gap between the first and second cores.

16. The optical switch according to claim 14, wherein the first core is disposed in the first side, and the second core is disposed in the second side.

17. The optical switch according to claim 16, wherein the at least two electrodes include first and second electrodes disposed on a plane substantially perpendicular to a plane containing optical axes of the first and second cores.

18. The optical switch according to claim 14 comprising third and fourth electrodes disposed in the second side and on a plane substantially perpendicular to the plane containing the optical axes of the first and second cores.

19. The optical switch according to claim 18, wherein the first electrode is located opposite from the second electrode with respect to the first core, and the third electrode is located opposite from the fourth electrode with respect to the second core.

20. The optical switch according to claim 19, wherein the first electrode is confronted, via the third core, with the third electrode, and the second is confronted, via the third core, with the fourth electrode.

* * * * *